G. A. OVERSTROM.
FLEXIBLE BEARING FOR HIGH SPEED SPINDLES.
APPLICATION FILED MAY 9, 1916.

1,273,655.

Patented July 23, 1918.
3 SHEETS—SHEET 1.

Inventor
Gustave A. Overstrom
by Arthur P. Knight
his Attorney

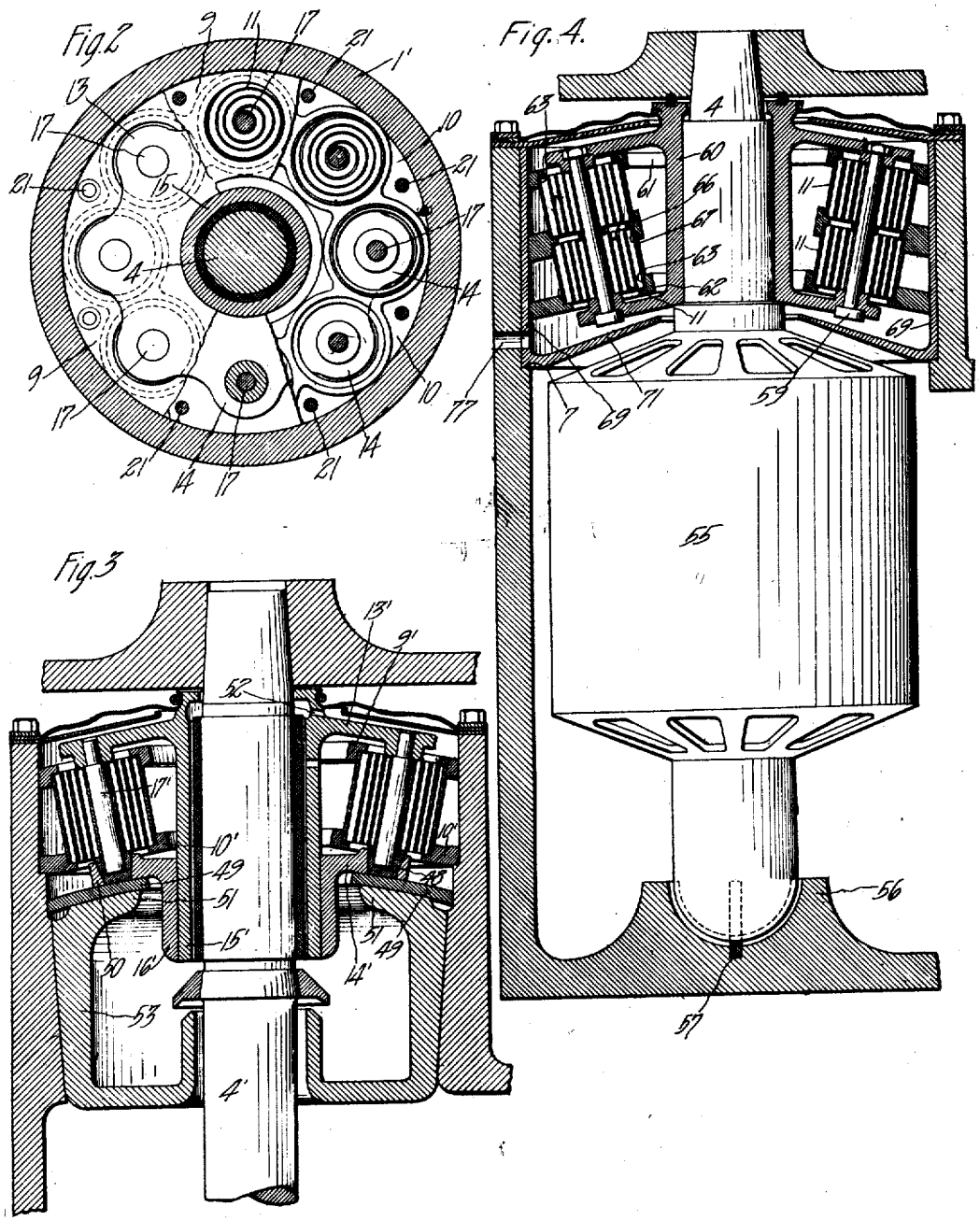

UNITED STATES PATENT OFFICE.

GUSTAVE A. OVERSTROM, OF PASADENA, CALIFORNIA.

FLEXIBLE BEARING FOR HIGH-SPEED SPINDLES.

1,273,655.  Specification of Letters Patent.  Patented July 23, 1918.

Application filed May 9, 1916. Serial No. 96,275.

*To all whom it may concern:*

Be it known that I, GUSTAVE A. OVERSTROM, a citizen of the United States, residing at Pasadena, in the county of Los Angeles and State of California, have invented a new and useful Flexible Bearing for High-Speed Spindles, of which the following is a specification.

This invention relates to bearings for high speed spindles, such as the spindles of centrifugal crushers, separators or other devices in which a shaft or spindle is driven at high speed and requires a bearing which is resiliently supported so as to enable it to whirl or spin with minimum strain or friction on its bearings.

The main object of the present invention is to provide a flexible or resiliently supported bearing for the stated purpose, in which there will be a minimum of friction and wear. In this connection the invention provides for mounting the bearing without the use of relatively slipping or sliding parts so that the wear and friction due to movement of such parts is avoided.

Another object of the invention is to provide a resiliently supported bearing construction in which a plurality of springs are employed and in which each spring is effective in sustaining the lateral stresses in any direction so that the full power of all the springs is utilized at all times.

The accompanying drawings illustrate embodiments of my invention, and referring thereto, Figure 1 is a vertical section of a portion of a centrifugal crusher embodying my invention.

Fig. 2 is a plan view of the flexible bearing therefor, with parts broken away.

Fig. 3 is a vertical section of a modified form of the bearing.

Fig. 4 is a vertical section of another form of the invention, showing the motor mounted directly on the spindle.

Figure 1:
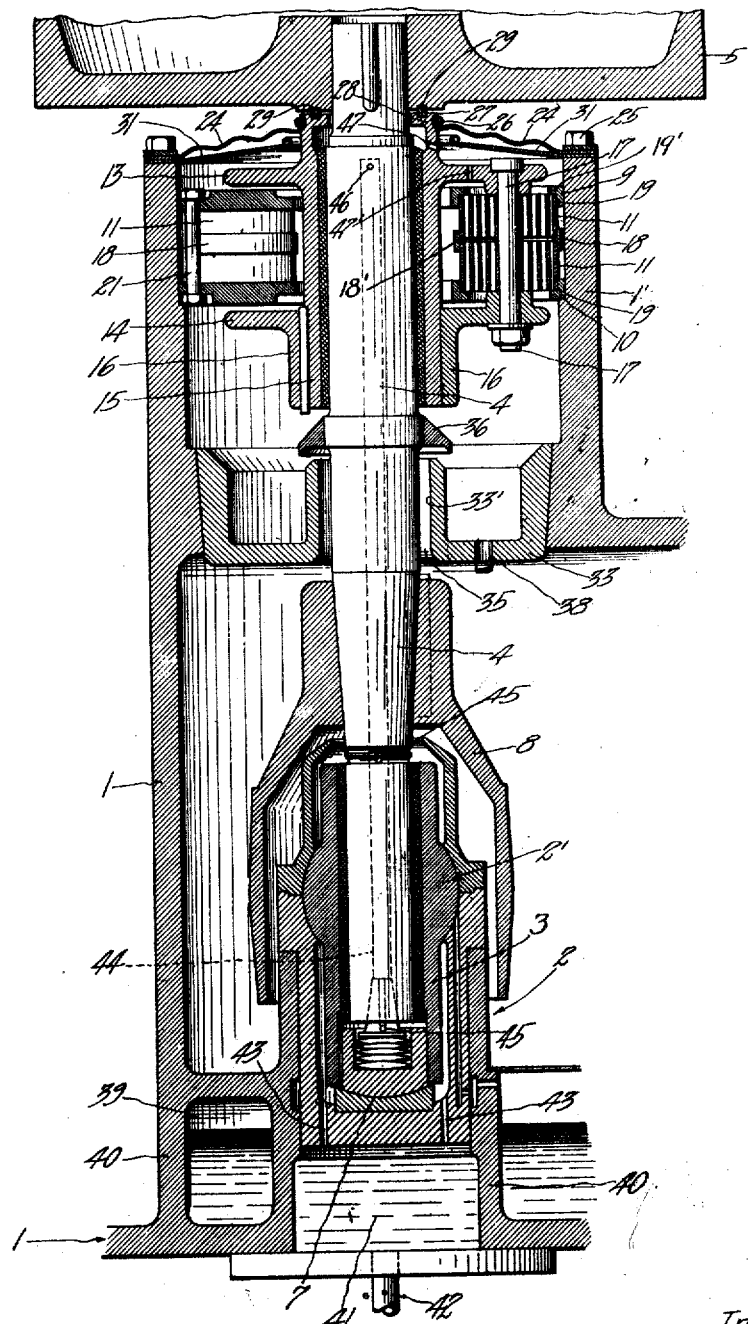

Referring to Figs. 1 and 2, 1 designates a part of the frame of a centrifugal crusher provided at its lower portion with a lower bearing support 2 supporting a lower bearing 3 and at its upper portion with a flexibly or resiliently supported bearing for the spindle 4 of the crusher, said spindle carrying at its upper end any suitable form of impeller, indicated at 5, adapted to receive the stones, etc., and to discharge them tangentially at high velocity in the usual manner. Lower bearing support 2 may be of any suitable construction, being herein shown as comprising a spherical bearing portion 2' and a lower end bearing portion 7 concentric with the center of said spherical bearing, the lower bearing 3 for spindle 4 being provided with bearing faces coöperating respectively with said bearing portions. Driving means, such as pulley 8, is mounted on spindle 4, and extends around the lower bearing portion 2' so that tilting movement of the spindle on said bearing portion will not affect the driving operation.

The upper bearing for the spindle 4 is mounted within a tubular or cylindrical frame member 1' carried by the frame portion 1, and comprises upper and lower supporting rings 9 and 10 fitting within said frame member 1', springs 11 mounted between said upper and lower supporting members and upper and lower members 13 and 14 carried by bearing means 15 and connected to said springs. Member 13 may, as shown, consist of a flange extending outwardly from said bearing means 15, which may consist, for example, of a hub or sleeve provided with a lining in which the spindle 4 is adapted to rotate, and the lower member 14 may be formed as a flange on a collar 16 keyed to said bearing means 15. Bolts 17 connect the upper and lower members 13 and 14 and extend through the springs 11, said springs being formed as spiral springs, the innermost turn of each spring closely fitting on the corresponding bolt 17 and the outermost turn of each spring closely fitting within cylindrical recesses, seats or shoulders 19 formed on the respective members 9 and 10. Bolts 21 extend between the members 9 and 10 and clamp them rigidly on to the outermost portions of the respective springs 11. Said springs 11 are arranged around the spindle 4, there being as many of these springs as required to take up or sustain the pressures or stresses due to the revolution of the shaft at high speed when operating under load. These springs are preferably spiral springs, each spring being formed of a strip of resilient sheet metal coiled in the manner of a clock spring, and in the form of a true spiral, continually increasing its distance from the center from one end to the other, and with each turn surrounding the preceding turn, as distinguished from a helical spring. Each spring is, however, provided with innermost and outermost coils of substantially cylindrical shape adapted to tightly engage bolts 17 and shoulders 19 respectively. The cylindrical shoulders 19 have inturned portions 19' engaging the ends of said outermost coils to prevent longitudinal or axial displacement of said springs relative to members 9 and 10. In order to provide the requisite radial resistance without undue longitudinal stiffness of motion, that is to say, motion in a direction parallel to the axes of the springs, a plurality, for example two, springs may be provided around each bolt 17, an intermediate collar 18 extending between the springs and engaging the same in a similar manner to shoulders 19, said collar 18 being provided with an inward projection 18' engaging the ends of the outermost coils of the springs similarly to portions 19'. With the springs arranged as shown in Fig. 1 any deflection of the shaft or spindle 4 from vertical position will result in vertical or endwise movement or displacement of the bolts 17 with relation to the supporting frame, and in this endwise movement the springs 11 must yield in such manner that the inner portions of the springs move longitudinally or axially with reference to their outer portions. The resistance of such longitudinal or axial displacement increases with the height of the springs so that, by subdividing the springs as shown, this resistance is diminished while at the same time the requisite radial stiffness is secured.

In order to prevent entrance of dust or dirt, etc., into the bearing, I prefer to cover the same with an apron 24 of suitable flexible material, such as leather, canvas, etc., fastened by means 25 on top of the cylindrical frame member 1' and secured at its inner end by snap rings 26 into an annular groove 27 on an upward extension 28 of the bearing means 15. A gasket or packing ring 29 on top of this bearing extension prevents entrance of dust, etc., at the top of the bearing. The apron 24 may be supported by a sheet metal disk or ring 31 secured on top of the frame member 1' and extending inwardly beneath the said apron. The lower end of the cylindrical frame member 1' may be closed by an annular cup-shaped member 33 separated from the spindle 4 by a space indicated at 35 sufficient to allow the necessary play of the shaft, a collar 36 on said spindle extending over the inner wall 33' of member 33 to shed any oil running down from the bearing into the annular cup-shaped member 33, whence it may be drained away by an outlet pipe 38 through suitable means for receiving the oil and pumping it back to the bearing. Oil receiving means as indicated at 39 in the base 40 of the frame 1 and an oil chamber 41 formed in said base are connected by a pipe 42 to suitable oil pumping means and communicate through passages 43 with the lower bearing 2 and with a bore 44 formed in the spindle 4, said bore communicating with apertures 45 and 46 opening respectively at the top of the lower bearing 2 and at the upper portion of the upper bearing. In the operation of the machine oil will pass from this upper aperture 46 to all parts of the upper bearing, and so much of the oil as passes to the top of the upper bearing will escape through passages 47 in the bearing extension 28 and, running down over the upper flange 13 and through the openings 47' therein, will lubricate all the parts of the spring 11 and the supporting devices therefor.

Normally the spindle 4 is held in centralized position by the operation of all the springs 11 which connect the bolts 17 and the supporting members 9 and 10 in such manner that said spindle is resiliently supported from the frame member 1' by each one of these springs. When the spindle 4 is rotated at high speed and the machine is in operation, material being received by and thrown from the impeller 5 in the usual manner, there is a tendency for the spindle to press laterally on the upper bearing, this lateral pressure varying in tension and in the direction in which it is exerted but requiring at all times a resilient support to the bearing which will resist undue displacement of the spindle while permitting sufficient play or lateral movement thereof to prevent undue wear or friction on the bearing. The form of spring shown, namely a spiral spring connected at its inner and outer portions to the supporting frame and to the shaft bearing, is eminently adapted for this purpose as it enables each spring to exert its full resilient restoring action on the spindle in whatever direction the latter is laterally displaced, the construction being such that the action of the spring is the same in all directions. In devices of this character where coil springs have been used extending between the shaft bearing and fixed supporting means, lateral displacement of shaft results in effective action of the spring or springs at only one side of the shaft, and the opposing springs counteract one another, with the result that the springs have to be made unduly heavy and are not sufficiently responsive or rapid in action to enable the bearing to accommodate itself to the motion of the shaft at all times. By making all of the springs equally operative at all times I am enabled to decrease the weight of the springs and to make them sufficiently sensitive and rapid in action to follow all of the movements of the spindle thereby reducing the strain and wear on the bearing to a minimum. This uniform action of each spring in all directions arises from the fact that the spring, being a spiral spring attached at its center to the bearing and at its periphery to the bearing support is subjected to similar deformation whatever may be the directions of lateral displacement of the bearing relative to its support, and displacement in any direction will produce a force tending to restore the parts to normal position.

As shown in Fig. 3 the spring members 11 may be so disposed that the axes converge to the center of gyration of the spindle 4, thereby obviating any tendency to relative endwise movement of the bearing and its support. The members 9', 10', 13' and 14', mounted respectively on the bearing and on the fixed support and engaging respectively with the center portions and with the peripheral portions of the respective springs, being in this case dished so as to extend at right angles to the axes of said springs. The conical bushings 48 are provided at the lower ends of the center pins 17' to facilitate insertion of said pins, said taper bushing being seated in taper seats on a collar 16' mounted on the bearing member 15', in this case the center pins 17' extending through the respective coil springs and connecting them to the respective members 13' and 14' are held in position by collar 16'.

In order to retain oil in contact with the springs, a packing ring 49 may be provided between the lower face of a flange 50 on collar 16' and a flange 51 on the cup member 53 at the bottom of the frame member 1', so that oil passing from the bearing as above described, through the passage 47, will flood the spring parts and will overflow through the passage 52 on the wall of bearing member 15'.

Fig. 4 shows the application of the invention in connection with a centrifugal crusher in which the motor, indicated at 55 is mounted on the spindle 4 so as to partake of the gyratory motion thereof, the lower bearing 56 of said motor being provided with means indicated at 57 for preventing rotation of the stator portion of the motor. A spindle 4 in this case constitutes the motor shaft and is mounted to rotate relatively to the stator in any suitable manner. In this case springs indicated at 11 are arranged in pairs around the spindle 4, the springs of each pair being superimposed with a bolt 59 extending through the centers of each pair of springs and through upper and lower flanges on a bearing member 60 forming an upper bearing for spindle 4. The support for the springs in this case is shown as comprising upper and lower rings 61 and 62 provided with seats 63 for engaging and supporting the peripheral portions of the upper and lower springs, an intermediate ring 66 extending between the springs of each pair and provided with seat portions 67 for engaging the peripheral portions thereof. The several rings 61, 62, 66, fit within a cylindrical lining 69 mounted within the frame member 1' and resting upon a shoulder 7, said lining having an inwardly extending flange 71 to receive the oil from the bearing and direct it to an outlet 77.

Figure 5:
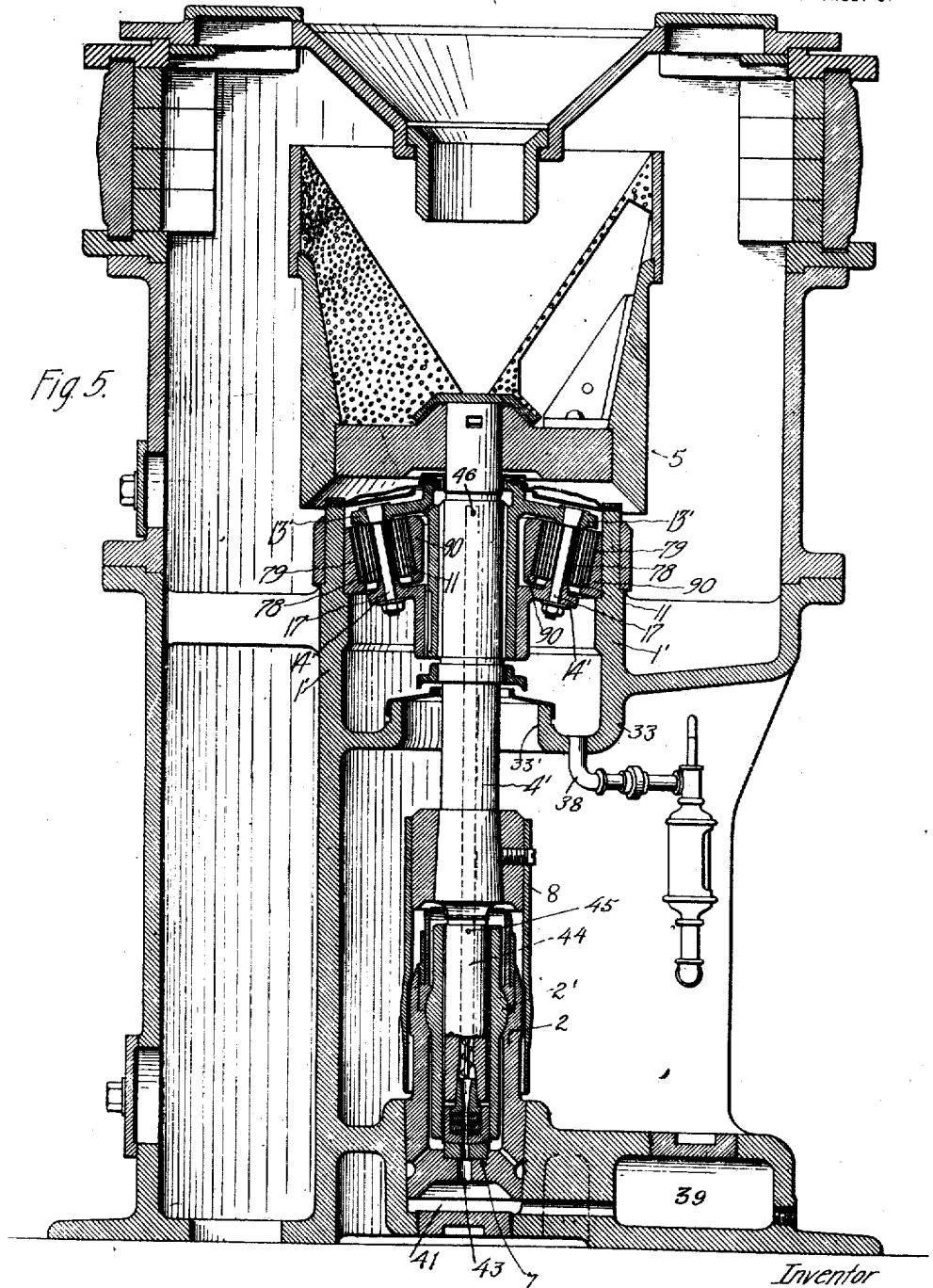
Fig. 5 is a vertical section of another form of the invention.

In order to insure that the spring members will be neutral or free from strain in the normal position of the spindle, I prefer, in some cases, to mount them as shown in Fig. 5 in which the bolts 17 are mounted on collar members 13' and 14', similarly to the construction shown in Fig. 3, with the exception that the said bolts are fitted in the upper collar 13' by taper heads on the bolts fitting in taper sockets on the said collar, and the springs 11 surrounding bushings 78 on said bolts are inclosed within babbitt linings 79 which are cast between the springs and a cage member 90 fitting within the frame member 1'. By properly assembling the parts before the babbitt is poured the springs will be supported in such relation that there is no tension in any direction on any of the springs in the normal position of the spindle, and uniform action of all the springs in any displacement of the spindle is thereby insured.

In all of the above described embodiments of my invention it is important that the natural rate of vibration of the spring or spring system should be in excess of the normal rate of revolution of the shaft, so that the spring will respond to every lateral movement of the shaft in time to prevent excessive movement. By providing a plurality of springs arranged around the shaft and all operating simultaneously in the same manner and normally neutral, that is to say, without strain when the shaft is running in centralized position, the important advantage is obtained that breakage or disabling of any spring does not decentralize the system or unbalance the action.

What I claim is:—

1. A flexible bearing for high speed spindles comprising a supporting member, a bearing member for the spindle, and a series of spiral springs arranged in a circle about the center of the spindle, each of said springs consisting of a resilient metal strip coiled in a plurality of turns, each turn surrounding the preceding turn, and each spring engaging at its outer end one of said members and engaging at its inner end the other of said members.

2. A flexible bearing for high speed spindles comprising a fixed member, a bearing member for the spindle, supporting means on said fixed member, supporting means on said bearing member, and a series of spiral springs arranged in different angular positions around the center of the spindle, each of said springs consisting of a resilient metal strip coiled in the form of a clock spring engaging at its outer portion one of said supporting means and engaging at its inner portion the other of said supporting means.

3. A flexible bearing for high speed spindles comprising fixed supporting means, bearing means for the spindle, supporting means mounted on said bearing means, and a series of spiral springs arranged in a circle around the center of said spindle, each of said springs consisting of a resilient metal strip coiled in the form of a clock spring, the outermost end portion of each of said springs being engaged throughout one complete turn thereof by one of said supporting means, and the innermost portion of each of said springs being engaged by the other of said supporting means, so that radial motion of the spindle in any direction will be uniformly resisted by all the springs at all times.

4. A flexible bearing for high speed spindles comprising a fixed member, a floating member, a series of cylindrical supporting devices symmetrically placed around the center of one of said members and attached thereto, a series of bolts extending through said cylindrical supporting devices and attached to the other of said members, and a series of spring devices within said cylindrical supporting devices and around said bolts.

5. A flexible bearing for high speed spindles comprising a supporting member, a bearing member for the spindle, casing members on said supporting member disposed in different angular positions around the spindle, members extending through said casing members and attached to said bearing member, and spring devices within said casing members and around the members extending therethrough.

6. The combination of a high speed spindle and a flexible bearing therefor, said spindle being mounted to gyrate about a center below said bearing, and said bearing comprising a fixed supporting member, a bearing member for the spindle, and a series of spiral springs disposed in different angular positions around the spindle and engaging one of said members at their outer portions and engaging the other of said members at their inner portions, and said springs having their axes extending radially with respect to said center about which the spindle gyrates.

In testimony whereof I have hereunto set my hand at Los Angeles, California, this 2nd day of May, 1916.

GUSTAVE A. OVERSTROM.